Aug. 15, 1933.  D. R. SHOULTS  1,922,870
TENSION CONTROLLING SYSTEM
Filed March 5, 1932
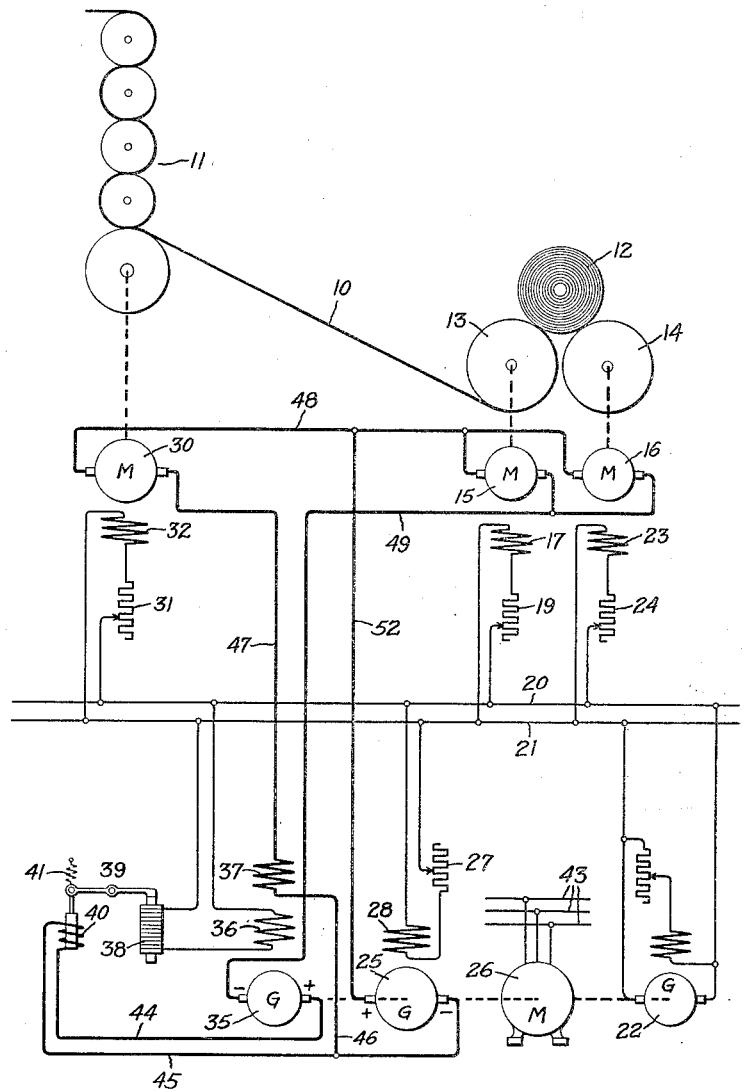
Inventor:
David R. Shoults,
by Charles E. Tullar
His Attorney.

Patented Aug. 15, 1933

1,922,870

UNITED STATES PATENT OFFICE 1,922,870

TENSION CONTROLLING SYSTEM

David R. Shoults, Scotia, N. Y., assignor to General Electric Company, a Corporation of New York Application March 5, 1932. Serial No. 597,035

4 Claims. (Cl. 242—75)

My invention relates to motor control systems wherein a substantially constant differential of torque is to be maintained between two or more motors, and has for an object the provision of a simple, efficient and reliable system of this character.

One application where my invention may be used advantageously is in the maintenance of a predetermined tension in a strip of paper between the calender rolls and the winding reel of a paper processing machine. While particularly applicable to control systems for sheet material, it is to be understood that my invention may be applied whenever it is desirable to maintain a torque differential between two elements of a mechanism.

In accordance with my invention in one form thereof, I provide a variable voltage drive for a plurality of motors arranged to independently drive elements of a mechanism, together with an auxiliary generator connected in series with the motors driving one element of the mechanism so that the auxiliary generator may be excited to produce a substantially constant differential of torque between the motors, thereby maintaining a tension on material driven by the elements.

For a more complete understanding of my invention, reference should now be had to the drawing, in which Fig. 1 diagrammatically illustrates my invention as applied to a control system for maintaining constant tension on a strip of paper supplied from the calender roll and received by a winding reel.

Referring to the drawing, I have shown my invention in one form as applied to the control of the tension of a strip of paper 10 received from a calender roll 11 and wound upon a reel 12. This reel is supported by the rolls 13 and 14, which rolls are respectively driven by the direct current motors 15 and 16. A separately excited field winding 17 provides excitation for the motor 15. This field winding is connected to a field rheostat 19 across a constant voltage source of direct current supply, as indicated by the supply lines 20 and 21 connected to a self excited generator 22. Similarly, a separately excited field winding 23 connected in series with a field rheostat 24 supplies excitation for the motor 16. A variable voltage direct current generator 25 driven by an alternating current motor 26 is connected to supply current to the motors 15 and 16. The excitation and voltage of the generator 25 is controlled by means of a field rheostat 27 connected in series with a separately excited field winding 28. It will be understood of course that by means of the rheostat 27 the speed of the motors 15 and 16 may be varied as desired. The driving motor 30 for the calender roll 11 is also connected to receive current from the load generator 25 and its speed is determined by the voltage of the load generator. The excitation of this motor is controlled by means of a rheostat 31 connected in series with a separately excited field winding 32.

In order to introduce a torque differential between the motor 30 and the motors 15 and 16 an auxiliary generator 35 is connected in series with the motors 15 and 16. The auxiliary generator has a field winding 37 connected in series with the motor 30 and a separately excited field winding 36. In series with the field winding 36 is a carbon pile resistance 38 forming a part of a regulator 39. The operating coil 40 of the regulator 39 is connected in series with the auxiliary generator 35. A spring 41 is arranged to apply pressure on the carbon pile resistance 38 against the pull of the coil 40.

With the above understanding of the elements and their organization with respect to each other in the system, the operation of the system itself and the manner in which the generator 35 is controlled to maintain constant tension in the strip of paper 10, irrespective of whether the paper is in motion or at a standstill, will be readily understood from the description which follows:

It will be assumed that the alternating current motor 26 is energized from the alternating current source of supply indicated by the supply lines 43 and that the exciter 22 is producing a substantially constant voltage on the excitation supply lines 20 and 21. It will be further assumed that the generator 25 has not been excited for the production of voltage. The auxiliary generator 35, however, may produce a voltage, the magnitude of which is dependent upon the excitation of the separately excited field winding 36. The resultant current flow may be traced from the positive brush of the generator 35, by conductor 44, operating coil 40 of the regulator 39, conductors 45 and 46, series field winding 37, conductor 47, armature of the motor 30, conductor 48, armatures of the motors 15 and 16, and by conductor 49 to the negative brush of the generator 35. It will be seen that in parallel with the circuit just traced is a circuit through the armature of the generator 25, armatures of motors 15 and 16, and by conductor 49 to the negative brush of the generator 35. The effect at standstill will be the same irrespective of the current division between these two parallel circuits. For example, the direction of current flow through the motors 15 and 16 will be in a direction to rotate the reel 12 so as to wind the strip of material thereon. The motor 30 will tend to rotate due to current flow, in a direction to unwind the strip of material from the reel 12. It will of course be obvious that by suitably varying the excitation produced by the field winding 36, any desired tension can be held on the paper at standstill.

The manner in which this initial tension is maintained during rotation will be seen by assuming that the field rheostat 27 is adjusted so that the field winding 28 causes the generator 25 to produce a voltage sufficient to initiate rotation of the motor 30. The reel driving motors 15 and 16 may then rotate inasmuch as the strip of paper 10 will be moving through the calender rolls. The reel motors 15 and 16 maintain the tension in the strip due to the constant tendency of these motors to rotate against the restrain of the strip of paper. The current flow in these motors is by way of conductors 52 and 48 and through the respective armatures. The return circuit for the motors 15 and 16 is by way of conductor 49, armature of auxiliary generator 35, operating coil 40 of regulator 39 and by conductor 45 to the negative brush of the load generator. The return circuit of the motor 30 is by way of conductor 47, series field winding 37 and by conductors 46 and 45 to the negative brush. Even though the motors are rotating the auxiliary generator 35 will supply additional energy to the motors 15 and 16 so that these motors will tend to rotate at a greater speed than the motor 30. Inasmuch as these motors are mechanically connected together by means of a strip of paper 10, it will be seen that the result is a torque differential between the motors 15 and 16 and the motor 30.

If the load on the motor 30 should increase there will be a corresponding decrease in speed and an increase of armature current. The field winding 37 connected in series with the motor 30 is connected so as to diminish the excitation on the auxiliary generator 35. The consequent reduction in voltage of the auxiliary generator 35 will be reflected on the motors 15 and 16 by a corresponding reduction in speed. The result is the maintenance of a substantially constant torque differential due to changes in load on the motor 30.

If the current flow through the motors 15 and 16 tends to increase, the coil 40 of the regulator 39 operating against the bias of the spring 41 causes a decrease in the excitation current of the field winding 36. The result is a diminution in current supplied to the motors 15 and 16 by the auxiliary generator 35. Therefore, through the joint operation of the field windings 36 and 37 on the auxiliary generator 35 the tension on the strip 10 is maintained constant for varying the speeds and loads of the motors 15, 16 and 30.

While I have shown a particular embodiment of my invention, it will be understood of course, that I do not wish to be limited thereto since many modifications may be made, and I therefore contemplate by the appended claims to cover any such modifications as fall within the true spirit and scope of my invention.

What I claim as new and desire to secure by Letters Patent in the United States is:

1. In a variable voltage drive, the combination with a load generator, of a plurality of motors mechanically connected together and arranged to receive power from said load generator, an auxiliary generator having a plurality of field windings, at least one of which is separately excited, driving means for said generators, connections for connecting said auxiliary generator in series with one of said motors so that said auxiliary generator produces a differential or torque between said motors.

2. In a variable voltage drive, the combination with a load generator, of a plurality of motors mechanically connected together and electrically connected to receive power from said load generator, an auxiliary generator having a plurality of field windings, one of which is separately excited, and another of which is connected to provide excitation on said generator in response to the load current of one set of said motors, and means responsive to the load current of the other of said set of motors for decreasing the excitation on said auxiliary generator.

3. In a variable voltage drive, the combination with a load generator, a plurality of motors connected to receive power from said load generator, means for mechanically connecting said motors together to operate at the same speed, an auxiliary generator having a plurality of field windings, at least one of which is separately excited, driving means for said generators, connections for connecting said auxiliary generator in series with one or more of said motors so that said auxiliary generator may produce a differential of torque between the motors included in said auxiliary generator circuit and those excluded from said circuit, and means for varying the excitation of said auxiliary generator in accordance with unequal changes of load upon said respective sets of motors so as to maintain constant said differential of torque.

4. In a control system, the combination of a calender stack and a winding reel arranged to wind material from the calender stack the material forming a mechanical connection between said calender stack and said reel, motor means for driving said calender stack and a second motor means for driving said winding reel, a load generator connected to jointly supply power to said motor means, an auxiliary generator having a plurality of field windings at least one of which is separately excited, driving means for said generators, connections for connecting said auxiliary generator in series with the reel driving motor means, and means for controlling the excitation of said auxiliary generator so that a substantially constant differential of torque is maintained between the calender stack and the reel irrespective of unequal changes in load between said calender motor means and said reel motor means.

DAVID R. SHOULTS.